United States Patent [19]
Benitez

[11] Patent Number: 5,815,721
[45] Date of Patent: Sep. 29, 1998

[54] METHOD AND APPARATUS FOR OPTIMIZING COMPLEX CONTROL STRUCTURES USING ABSTRACT WEB PATTERNS

[75] Inventor: Manuel E. Benitez, Sunnyvale, Calif.

[73] Assignee: Hewlett-Packard Company, Palo Alto, Calif.

[21] Appl. No.: 637,988

[22] Filed: Apr. 25, 1996

[51] Int. Cl.[6] ............................... G06F 9/45; G06F 9/44
[52] U.S. Cl. ..................... 395/709; 395/703; 395/705; 395/707; 395/680; 395/684
[58] Field of Search ........................... 364/280.4, 280.5, 364/280, 973, 262.4, 247; 295/705, 708, 709, 707, 680, 684, 703

[56] References Cited

U.S. PATENT DOCUMENTS

| | | | |
|---|---|---|---|
| 4,852,019 | 7/1989 | Vinberg et al. ........................... | 345/440 |
| 5,448,737 | 9/1995 | Burke et al. .............................. | 395/709 |
| 5,483,539 | 1/1996 | Kaufmann ................................ | 370/509 |
| 5,493,675 | 2/1996 | Faiman, Jr. et al. ..................... | 395/709 |
| 5,577,253 | 11/1996 | Blickstein ................................ | 395/705 |
| 5,613,117 | 3/1997 | Davidson et al. ........................ | 395/708 |
| 5,623,418 | 4/1997 | Rostoker et al. ........................ | 364/489 |
| 5,659,753 | 8/1997 | Murphy et al. .......................... | 395/705 |
| 5,682,208 | 10/1997 | Harney .................................... | 348/699 |
| 5,740,443 | 4/1998 | Carini ...................................... | 395/709 |

*Primary Examiner*—Emanuel Todd Voeltz
*Assistant Examiner*—Cuong H. Nguyen

[57] ABSTRACT

An optimizing compiler for optimizing a computer program. The compiler builds abstract web representations for the code segments of the computer program. The compiler also maintains a library of abstract web patterns. Each abstract pattern in the library represents an optimized sequence of computer instructions. The compiler compares each abstract web generated from the code segments with the abstract web patterns in its library. If any of the abstract webs match, the compiler replaces the original code segment in the computer program with the optimized sequence of instructions corresponding to the matching abstract web pattern. By using the above described technique, the compiler can replace loops with instructions that implicitly iterate. In addition, the compiler can micro-vectorize code segments and remove unnecessary instructions from loops.

19 Claims, 1 Drawing Sheet

METHOD AND APPARATUS FOR OPTIMIZING COMPLEX CONTROL STRUCTURES USING ABSTRACT WEB PATTERNS

TECHNICAL FIELD OF THE INVENTION

This invention pertains in general to optimizing compilers and in particular to a compiler for optimizing complex control flow structures.

BACKGROUND OF THE INVENTION

Many computer architectures, such as Reduced Instruction-Set Computer (RISC) architectures, provide instructions which implicitly iterate. Examples of these instructions include variable shift and rotate instructions, find-first-bit instructions, and multimedia support instructions. Other architectures, such as INTEL x86 compatible architectures, provide instruction prefix codes which can be used to iteratively execute instructions.

Optimizing compilers, however, rarely produce implicitly iterative instructions. Even in cases where the source language provides support for such instructions, such as the shift operators in the C programming language, there is often no way to describe iterative operations for word sizes outside the range of the built-in types provided by the language.

In addition, when coding in a portable programming language, such as C, the programmer must ensure that the code will execute on as many machines as possible. Therefore, the programmer needs to be aware of common hardware limitations and design code that will execute properly given those limitations. Often, such code can be greatly optimized if the hardware does not have the limitations.

For example, most present-day computer architectures support 32-bit integers. If the programmer is working with 64-bit integers, the programmer must take special steps to ensure that the code functions properly on 32-bit architectures. Thus, the following C language code uses two 32-bit variables to implement a 64-bit right shift operation and sets a flag (shift_out) to indicate whether any "1" bits have been shifted out:

```
shift_out = 0;
while (shift_amount > 0) {
    shift_out |= low_part & 1;
    low_part >>= 1;
    low_part |= high_part << 31;
    high_part >>= 1;
    shift_amount- -;
}
```

The above code would execute correctly if compiled and run on a 64-bit computer. However, the compiled code would be woefully inefficient in light of the fact that the entire 64-bit shift operation could be implemented without a loop and using just a few simple instructions.

To remedy the inefficiencies described above, programmers use hardware-specific optimizing compilers to produce executable programs. Most optimizing compilers use a technique known as "peephole optimization" to detect sequences of instructions that can be merged into simpler instruction sequences. Peephole optimization almost always works on single basic blocks and, in rare cases, across blocks that form extended basic blocks. Complex control flow structures like loops, however, require additional analyzation mechanisms that are beyond the range of peephole optimization.

Other compilers use specific pattern matching to detect loops that can be optimized. Such compilers seek to detect specific sets of instructions that can be reduced. These compilers, however, rely heavily upon the compiler designer to identify specific sequences of instructions that can be optimized and then to code a specific set of routines that transform the code. Slight variations in the code, such as a change in the location of a variable, may alter the code enough that the compiler does not detect the possible optimization.

Accordingly, there is a need in the art for a compiler that can recognize and optimize code constructs despite the minor variations that occur in the course of programming.

There is another need in the art for a compiler that can optimize complex control flow structures such as loops.

There is yet another need in the art for a compiler that can effectively microvectorize code.

SUMMARY OF THE INVENTION

The above and other needs are met by a system and method of implementing an optimizing compiler that builds an abstract web representation of the semantic actions performed by each instruction in a control flow structure. Then, the compiler uses a web pattern matcher to compare the abstract web representation with a library of abstract web patterns maintained by the compiler. Each abstract web pattern in the library represents an optimized code sequence. If the abstract web representation matches an abstract web pattern in the library, then the control flow structure can be performed using faster straight-line (i.e., non-iterating) code. If there is a match, the compiler replaces the iterative control structure with the faster code.

A technical advantage of the present invention is that the optimizing compiler is not affected by minor variations in the code because such variations do not change the abstract web representation.

Another technical advantage of the present invention is that the compiler can recognize and optimize code having a complex control flow.

Yet another technical advantage of the present invention is that the compiler can recognize code that can be performed more efficiently using microvectorization and optimize the code accordingly.

Yet another technical advantage of the present invention is that the compiler can optimize code to gain better performance on wider-architecture computer systems.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

DESCRIPTION OF THE PREFERRED EMBODIMENTS

Figure 1:
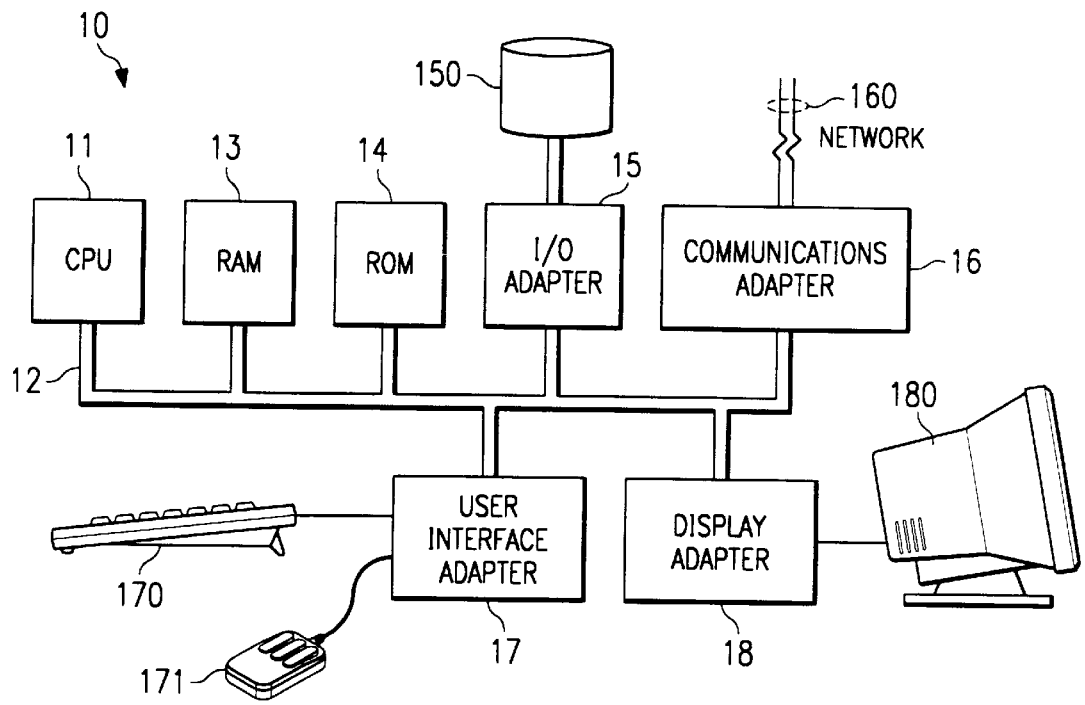
FIG. 1 is a high-level block diagram of a computer system adapted to execute a compiler according to the present invention.

FIG. 1 illustrates computer system 10 adapted to execute the present invention. Central processing unit (CPU) 11 is coupled to bus 12, which in turn is coupled to random access memory (RAM) 13, read only memory (ROM) 14, input/output (I/O) adapter 15, communications adapter 16, user interface adapter 17, and display adapter 18.

CPU 11 may be any general purpose CPU, such as a HP PA-8000. CPU 11 preferably has a reduced instruction set (RISC) architecture and supports 64-bit data words. However, the present invention is not restricted by the architecture of CPU 11. Thus, the present invention can be adapted to work with complex instruction set computers supporting, for example, 32 or 128-bit data.

RAM 13 and ROM 14 hold user and system data and programs as is well known in the art. I/O adapter 15 connects storage devices, such as hard drive 150, to the computer system. Communications adaption 16 is adapted to couple the computer system to a local or wide-area network 160. User interface adapter 17 couples user input devices, such as keyboard 170 and pointing device 171, to the computer system. Finally, display adapter 18 is driven by CPU 11 to control the display on display device 180.

As is well known in the art, an optimizing compiler embodying the present invention preferably resides on hard drive 150 and executes on CPU 11. A preferred embodiment of a compiler according to the present invention is the Hewlett-Packard PA__RISC optimizing compiler, available from Hewlett-Packard Company, Palo Alto, Calif. 95014. The rest of this discussion assumes that this compiler is being used to compile and optimize a program containing the following code:

```
shift__out = 0;                    //        line 1
while (shift__amount > 0) {        //             2
    shift__out |= low__part & 1;   //             3
    low__part >>= 1;               //             4
    low__part |= high__part << 31; //             5
    high__part >>= 1;              //             6
    shift__amount- -;              //             7
}
```

As discussed in the Background section and well understood in the art, the above code performs a right shift operation on a 64-bit variable by breaking the variable into two 32-bit components, low__part and high__part, and looping for each shift. The code is written in this manner so that it will compile and execute correctly on computers having 32-bit architectures. As discussed below, a compiler according to the present invention will optimize the above code to execute efficiently on a 64-bit computer.

When the program containing the above code is compiled by the inventive compiler, the compiler first converts the high level C code into low-level RISC assembly language code. There is a one-to-one correspondence between the assembly language code and the actual machine instructions executed by CPU 11.

Next, the compiler converts the low-level RISC code that forms the loop into a definition-use (def-use) chain and a control flow structure. The def-use chain, also referred to as a web, describes a set of definitions and uses for particular variables. The control flow structure, in contrast, shows how control flows through the program.

The compiler examines the control flow structure to identify structures that can be optimized. In the present example, the compiler identifies the above loop in the control flow. Then, the compiler examines the def-use web to consider each instruction and variable used in the loop.

Figure 2:
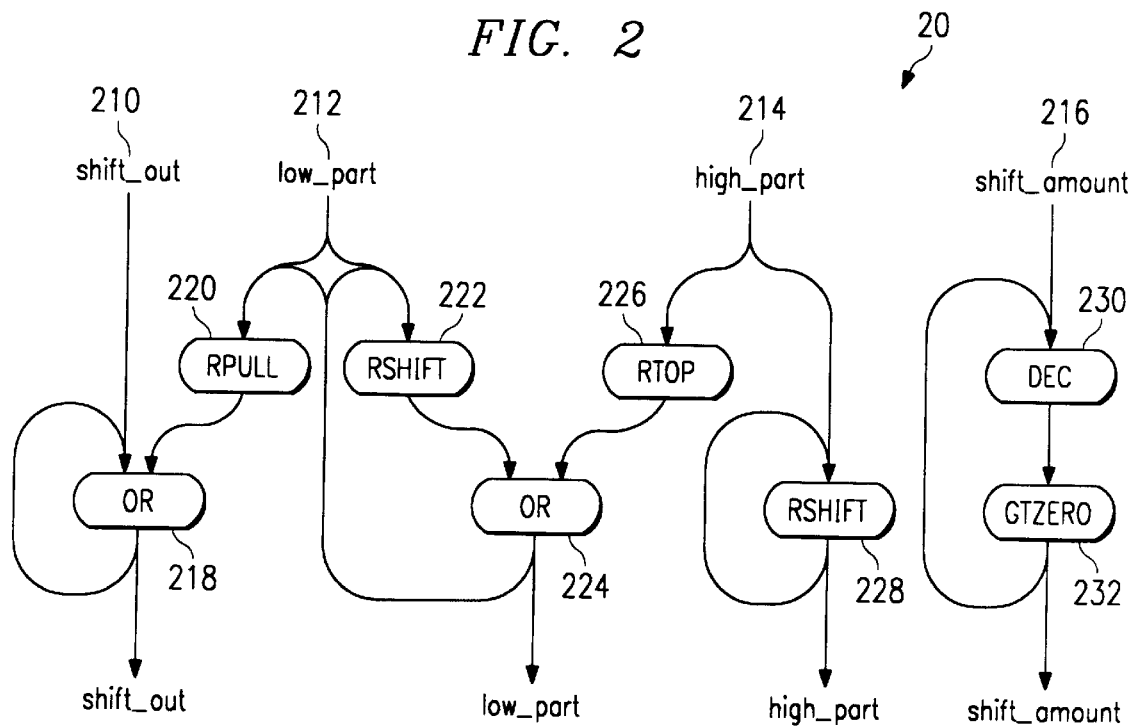
FIG. 2 is an illustration of an abstract web representation.

Next, the compiler builds an abstract web representation of the loop. FIG. 2 illustrates a possible abstract web representation 20 of the above loop. Abstract web 20 describes the relationship between each of the values entering, exiting, being carried across loop iterations, and existing within the confines of a single loop iteration. In addition, abstract web 20 describes the operations that are performed on these values. Note that the operations in web 20 do not necessarily have a one-to-one mapping to the low-level instructions produced by the compiler. Rather, abstract web 20 describes the effects of the instructions in abstract terms.

Each of the variables in the code 210, 212, 214, 216 is represented at the top of the abstract web. Arrows trace the operations on each variable for each iteration of the loop. Thus, shift__out 210 is connected with OR operation 218. Likewise, low__part 212 is connected with RPULL (right pull) operation 220 and RSHIFT (right shift) operation 222. High__part 214 is coupled to RTOP (take rightmost bit to the top and zero the rest) operation 226 and RSHIFT operation 228. Both RSHIFT operation 222 and RTOP 226 are coupled to OR operation 224. Finally, shift__amount 216 is coupled to DEC (decrement) operation 230. DEC operation 230 is coupled, in turn, to GTZERO (greater than zero) operation 232.

Abstract web 20 represents the above discussed code loop. For example, line 3 of the code, which performs a bitwise OR on shift__out 210 and the rightmost bit of low__part 212, is represented by the RPULL 220 and OR 218 operations. The loop connecting OR 218 to itself indicates that shift__out 210 is being OR'd with itself.

Note that the exact order of the instructions in the loop and whether extraneous copy instructions appear in the loop body have no impact on the abstract web 20 as long as the relationship between the values and the abstract operations performed on them remain identical. Accordingly, minor variations in the code do not affect the abstract web representation. Thus, the abstract web technique for recognizing loops is a significant advantage over simple peephole and pattern matching algorithms that must match the instructions used and the instructions' exact placement in order to correctly identify code sequences.

The next step in the optimization process is to apply a web matching algorithm to the abstract web 20 to determine if the web, or at least a part of the web, describes an operation that can be performed with an instruction or set of instructions that implicitly iterate. Preferably, the optimizing compiler maintains a library of abstract web patterns that represent optimizable operations. The compiler uses a pattern matching algorithm to compare the abstract web patterns in the library with the abstract webs generated from the source code. Any one of a number of well known pattern matching algorithms can be used. If a match is found, then the code can be removed and replaced with a straight-line code sequence that matches the semantics of the original code without the need to explicitly iterate. Thus, a loop that would likely require tens and perhaps even hundreds of machine cycles to execute could be replaced with code that requires many fewer machine cycles. For example, the code segment shown above could be replaced with a simple 64-bit right shift operation.

In addition, an optimizing compiler according to the present invention can detect loops that can be effectively micro-vectorized. Micro-vectorization, which entails using the wider-word capabilities (i.e., 64-bit) of newer architectures to perform multiple narrower (e.g., 2 32-bit words, 4 16-bit half-words, or 8 8-bit bytes) operations with a single instruction, is becoming an important code improvement technique. Microvectorization can be achieved by placing abstract web patterns in the libary for loops that can be microvectorized. Then, the web matching techniques described above can be used to identify such loops and replace the loops with microvectorized code.

In addition, a compiler according to the present invention can be used to isolate and optimize a part of an abstract web. For example, the compiler can detect a part of a loop that can be more efficiently performed outside of the loop, thereby reducing the number of machine cycles required to execute each iteration of the loop. One common example of this optimization occurs when a loop increments or decrements a counter that does not itself provide any values or control functions to the loop. Consider the following code:

```
for ( i = 0; i < limit; i++) {
    ...
    update++;
}
```

The above loop increments the counter "update" every time it iterates. The counter, however, is not referenced inside the loop except when it is incremented. The optimizing compiler described herein can be used to detect such counters and reduce their cost by effectively transforming the code as follows:

```
if (limit > 0)
    update += limit;
for (i = 0; i < limit; i++) {
    ...
}
```

Now, instead of having to perform an increment operation on each iteration of the loop, a simple test and add sequence performed just once outside of the loop will perform the desired function. Thus, the instructions will be performed in fewer machine cycles.

Although the present invention and its advantages have been described in detail, it should be understood that various changes, substitutions and alterations can be made herein without departing from the spirit and scope of the invention as defined by the appended claims.

What is claimed is:

1. A method of optimizing a selected program segment of a computer program, comprising the steps of:

generating a first abstract representation of the selected program segment;

comparing the first abstract representation with at least one other abstract representation stored in a memory of a computer system to determine if a match exists between the generated abstract representation and at least one other stored abstract representation, wherein each other abstract representation is associated with an optimized instruction sequence; and replacing the selected program segment with the optimized instruction sequence associated with a matched one of the at least one stored abstract representation.

2. The method of claim 1, wherein the generated and matched abstract representations are webs.

3. The method of claim 1, wherein the program sequence removes at least one instruction from within a loop.

4. The method of claim 3, wherein the optimized instruction segment moves instructions outside the loop.

5. The method of claim 1, wherein the optimized instruction sequence comprises at least one micro-vectorized instruction.

6. The method of claim 1, wherein the computer system comprises a 64-bit architecture.

7. An compiler adapted for execution on a computer system having a CPU and a memory, comprising:

means, executing on the CPU and stored in the memory, for converting a high-level computer program into low-level code comprised of at least one code segment;

means for scanning the low-level code and generating a first abstract representation of the code segment;

means for comparing the first abstract representation with at least one other abstract representation stored in the memory, wherein the compared at least one other abstract representation has an associated optimized code segment; and means for replacing the code segment with the optimized code segment corresponding to a matched one in the memory of the at least one other abstract representation.

8. The compiler of claim 7, wherein the first and at least one other abstract representations are webs.

9. The compiler of claim 7, wherein the code segment is a loop.

10. The compiler of claim 9, wherein the optimized code segment removes at least one instruction from within the loop.

11. The compiler of claim 7, wherein the optimized code segment comprises at least one micro-vectorized instruction.

12. The compiler of claim 7, wherein the computer system comprises a 64-bit architecture.

13. The compiler of claim 7, wherein the computer system comprises a RISC architecture.

14. A computer program product having a computer readable medium having computer program logic recorded thereon for optimizing code segments on a computer system having a processor and a memory, the computer program product comprising:

means, executing on the processor, for building a first abstract representation of a code segment;

means for comparing the first abstract representation with a second abstract representation stored in the memory, wherein the second abstract representation represents an optimized code segment;

means for replacing the code segment with the optimized code segment if the first and second abstract representations match.

15. The computer program product of claim 14, wherein the first and second abstract representations are webs.

16. The computer program product of claim 14, wherein the code segment is a loop.

17. The computer program product of claim 16, wherein the optimized code segment removes at least one instruction from within the loop.

18. The computer program product of claim 14, wherein the optimized code segment comprises at least one micro-vectorized instruction.

19. The computer program product of claim 14, wherein the second abstract representation is one of a plurality of abstract representations stored in the memory.

* * * * *